J. T. JOHNSON, Jr. & J. R. GAMMETER.
TIRE VULCANIZING BAG.
APPLICATION FILED NOV. 17, 1915.

1,177,112. Patented Mar. 28, 1916.

INVENTORS.
J. T. Johnson, Jr.,
J. R. Gammeter,
BY Robert M. Pierson
ATTORNEY

UNITED STATES PATENT OFFICE.

JOHN THOMAS JOHNSON, JR., AND JOHN R. GAMMETER, OF AKRON, OHIO, ASSIGNORS TO THE B. F. GOODRICH COMPANY, OF NEW YORK, N. Y., A CORPORATION OF NEW YORK.

TIRE-VULCANIZING BAG.

1,177,112.  Specification of Letters Patent.  Patented Mar. 28, 1916.

Application filed November 17, 1915. Serial No. 62,048.

*To all whom it may concern:*

Be it known that we, JOHN THOMAS JOHNSON, Jr., and JOHN R. GAMMETER, citizens of the United States, residing at Akron, in the county of Summit and State of Ohio, have invented certain new and useful Improvements in Tire-Vulcanizing Bags, of which the following is a specification.

This invention relates to the annular fluid-pressure bags which are employed in vulcanizing certain types of pneumatic-tire casings, such as cord tires, to hold them in an expanded condition while being cured. These bags, especially when used with water as a distending medium, are commonly made of layers of rubber and frictioned or skim-coated fabric, and their walls are subjected to considerable bending for the purpose of inserting the bag in the casing and removing it therefrom, the common practice being to collapse the bag with a vacuum when about to insert or remove it. Because of this repeated bending and the further fact that the walls of the bag become hardened and over-cured through continual heating, they have a comparatively short life. Furthermore, it is almost impossible without great inconvenience, to avoid the frequent occurrence of wrinkles in the wall of the bag when expanded to the fullest diameter which the confines of the tire and mold will allow, so that a corresponding ridge is formed on the inner surface of the tire; while the sharp bend at the wrinkle in the bag further tends to diminish its life.

Our object is to avoid or minimize the aforesaid objections, and to this end we employ a shield covering one side of the bag and preferably attached to the base of the latter, in the form of a continuous or endless flap, whereby the effect on the tire of the wrinkle in the bag is avoided, and the bag wall adjacent to the shield is kept softer than before, so that the life of the bag is prolonged.

Figure 1:
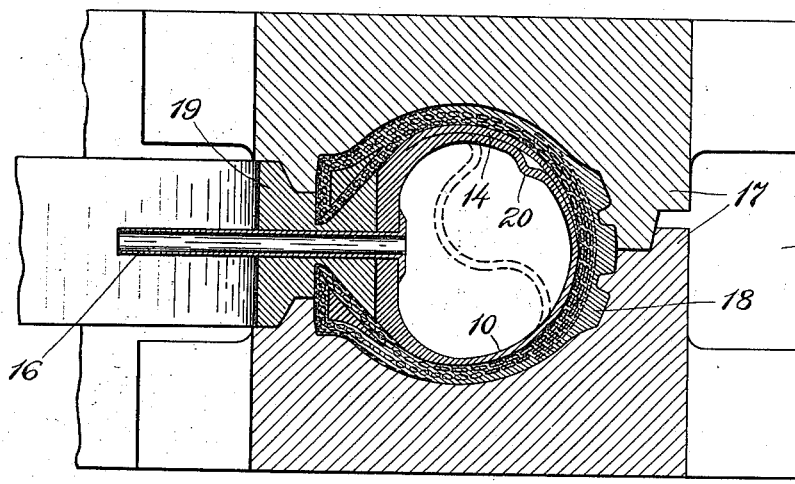
Figure 2:
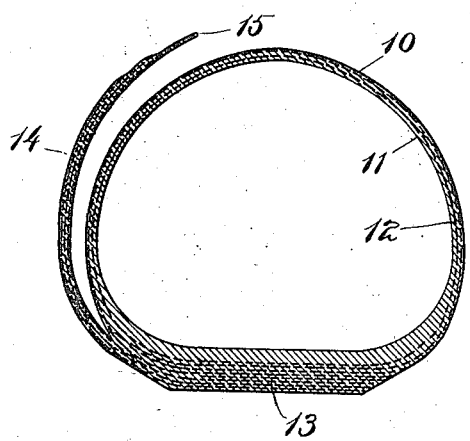
Figure 3:
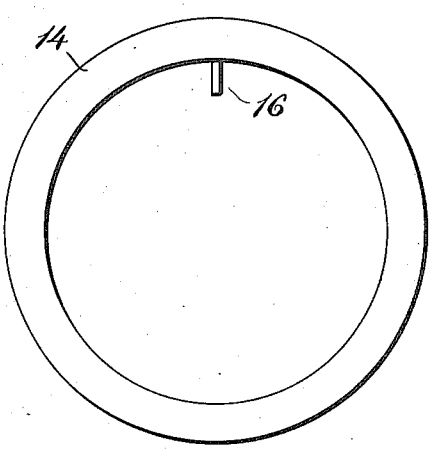

Of the accompanying drawings, Figure 1 represents a transverse section of a tire casing in place within a vulcanizing mold, and containing a fluid-pressure bag constructed according to our invention. Fig. 2 represents a transverse section of the bag. Fig. 3 represents a side elevation of the same on a reduced scale.

10 is an annular inflatable bag whose body is composed of the usual layers of rubber 11 and bias-cut rubberized woven fabric 12, suitably reinforced and thickened by extra layers of rubber and canvas at the base or inner wall 13.

14 is a shield adapted to cover one side of the bag 10 approximately as far as the middle line of the crown or outer periphery of the bag when the two are laid close together, said shield being composed of the same materials as the bag, and preferably attached by its inner margin to the base or inner wall 13 of the bag, so that its free portion forms a continuous annular flap which is prevented in any suitable way, as by covering the surface with soap-stone, from adhering to the side wall of the bag when the structure is being vulcanized. The edges of the fabric layers in the shield are stepped to taper the outer margin as indicated in Fig. 2, and we prefer to make the inner ply 15 of canvas having only a frictional coat of rubber, so that the extreme margin may remain very flexible and not break off, while the outer layers of canvas have a thicker skim coating.

16 is the inflating tube of the bag.

17 represents the outer vulcanizing mold, 18 a tire casing therein, and 19 the base ring of the mold for confining the beads of the tire.

The dotted-line position of the bag wall in Fig. 1 represents its partly collapsed condition, which is preferably initiated by any suitable means always on the same side of the bag (the shield side in this instance) before applying the vacuum, so that the wrinkle 20, which often remains after the bag is expanded as far as the confines of the tire and mold will permit, may occur in approximately the same place, in this case under the shield 14, in each successive use of the bag. As this wrinkle is bridged by the comparatively thick and stiff shield, the internal fluid pressure will be transmitted with substantial uniformity through the shield to all adjacent parts of the tire wall, and the presence of ridges in the latter will thereby be avoided. At the same time the bag-wall adjacent to the shield 14 is protected by the latter from the migration of sulfur from the tire into the bag-wall, which has heretofore been the principal cause of over-curing and brittleness of the bag after continued use. It is something of an advantage to have the shield itself become stiff in order that it may act more efficiently as a bridge over the wrinkle.

By confining the location of the shield to one side only of the bag 10, we are enabled to make the said shield endless or continuous, and by attaching it directly to the bag we increase the facility of manipulating and assembling the bag and shield with the tire-casing and removing them therefrom.

Various modifications may be made, and it is obviously possible to duplicate the shield 14 on the opposite side of the bag, as will be understood without illustration, although we have thus far found it unnecessary to do this.

Any suitable confining means may be used as an outer "mold" for the tire.

We claim:

1. Tire-vulcanizing apparatus comprising an outer mold, an inner annular inflatable pressure bag, and an endless annular shield covering a side wall of the bag.

2. An annular vulcanizing bag for pneumatic-tire casings, having a side-wall shield attached thereto.

3. An annular vulcanizing bag for pneumatic-tire casings, comprising a tubular body having a side-wall shield attached by its inner margin to the base or inner wall of the bag.

4. A vulcanizing bag for pneumatic-tire casings, comprising an annular tubular body of fabric and rubber, and a side shield composed of rubberized fabric attached to the base or inner wall of the bag and elsewhere free from the latter, said shield being circumferentially continuous and covering substantially one side only of the bag.

5. A vulcanizing bag for pneumatic-tire casings, comprising an annular tubular body of rubber and fabric, and a continuous annular shield covering one side of the bag, attached to the latter by its inner margin and free therefrom at its outer and intermediate portions, said shield comprising a ply of frictioned fabric and one or more plies of skim-coated rubberized fabric terminating short of the outer edge of the first-said ply.

In testimony whereof we have hereunto set our hands this thirteenth day of November, 1915.

JOHN THOMAS JOHNSON, Jr.
JOHN R. GAMMETER.